Figure 1:
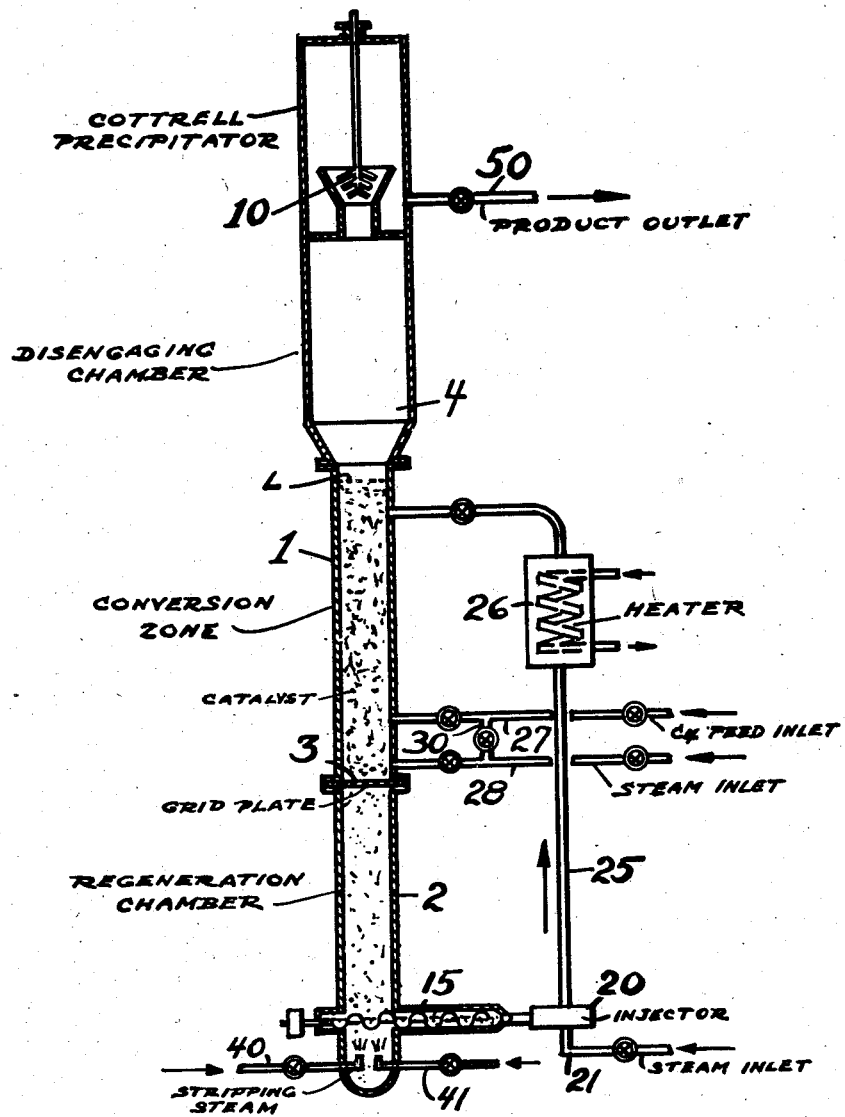
Figure 2:
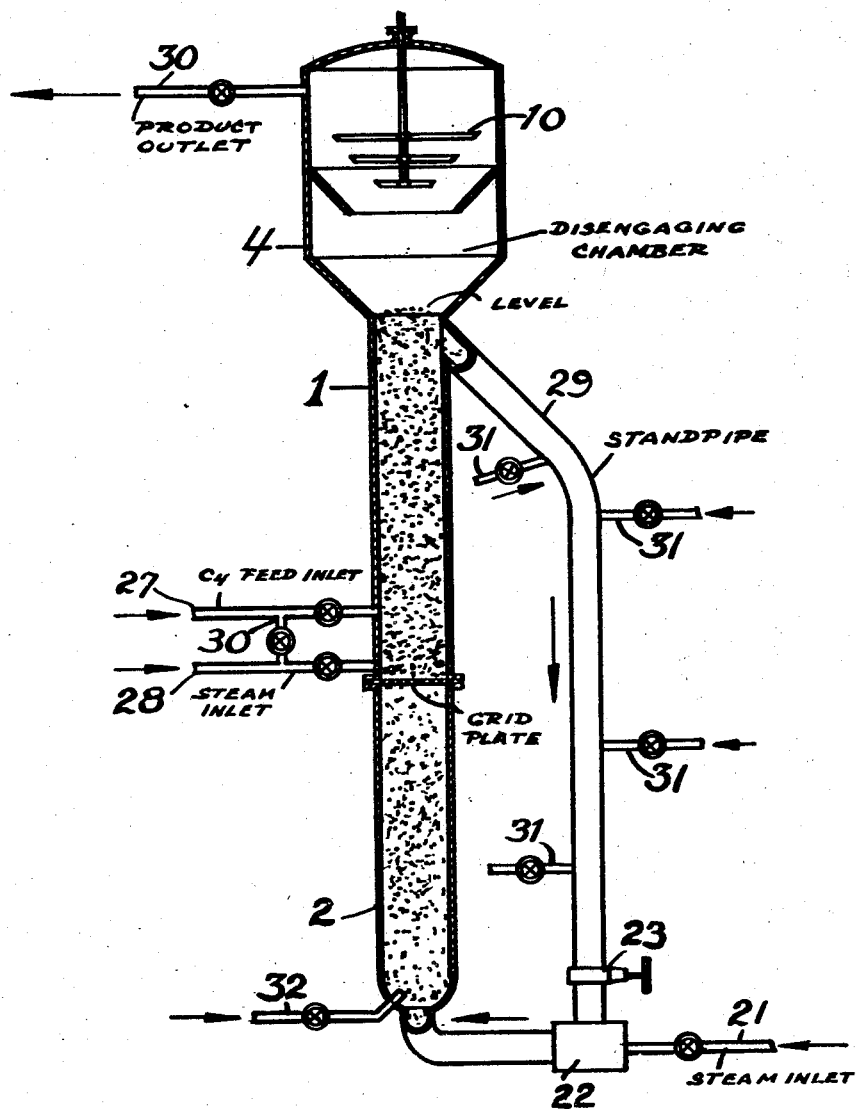

Edward D. Reeves Inventor
By Th. Young Attorney

Patented Nov. 26, 1946

2,411,592

UNITED STATES PATENT OFFICE 2,411,592

FLUID CATALYST REACTOR

Edward D. Reeves, Cranford, N. J., assignor to Standard Oil Development Company, a corporation of Delaware Application October 31, 1942, Serial No. 464,085

7 Claims. (Cl. 260—680)

The present invention relates to improvements in a process of and apparatus suitable for carrying out reactions involving solids and gases and, more particularly, it relates to an apparatus in which a gas and a solid in powder form may be contacted under reaction conditions where said reaction causes deposition of contaminants on the catalyst, the apparatus being adapted to provide means for causing the main reaction to take place in one portion of the apparatus while the regeneration of fouled catalyst takes place in another portion of said apparatus and is further provided with means for returning regenerated catalyst to the reaction zone so that the operation may be performed continuously.

In a great many chemical reactions, the presence of a solid catalyst in contact with reactants in vapor or vapor-liquid phase greatly improves the operation, particularly from the standpoint of quality of the product. For example, in gas oil cracking, the presence of a catalyst such as an acid treated clay of the bentonite or montmorillonite type in the gas oil vapors undergoing cracking greatly improves the octane number of the gasoline produced by cracking. In certain other reactions such as the dehydrogenation of olefins to form diolefins, the presence of a suitable catalyst such as that disclosed in the application of Kenneth K. Kearby, Serial No. 430,873, filed February 14, 1942, now U. S. Patent 2,395,875, dated March 5, 1946, makes possible the production of certain desired olefins and diolefins in good yields.

In the early stages of solid catalytic treatment of hydrocarbons for one purpose or another, the catalyst was disposed in the form of a stationary bed in a reactor and the hydrocarbon oil was vaporized and forced through the bed of catalyst at reaction temperatures, whereupon the desired conversion took place. However, in this type of operation deposits were formed on the catalyst which eventually necessitated discontinuing the productive phase of the operation and treating the catalyst with a substance adapted to remove the contaminants and restore the catalyst activity, because when the catalyst had acquired a maximum amount of the contaminating substance deposited as a result of the reaction, its activity was impaired. Later in the development of these catalytic processes of the type indicated, it was found that they could be operated continuously by suspending a powdered catalyst in the vapors, forcing the suspension through a reaction zone, withdrawing the reaction products from the reaction zone, separating the catalyst therefrom, regenerating the catalyst in a separate regeneration zone, and returning the regenerated catalyst to the reaction zone for further use in the process. A great deal of research has been directed toward improving the latter type of process which has come to be known as the fluid catalyst type of operation.

My present process relates to improvements in apparatus suitable for carrying out the fluid catalyst type of operation, and in its essence it involves an elongated vertical chamber of restricted cross sectional area, disposed and divided into two contiguous compartments, in the upper of which the conversion reaction takes place, while in the lower compartment the catalyst is regenerated and returned to the upper compartment. Certain necessary apparatus and component parts are affiliated with the compartments just mentioned in order to provide maximum efficiency, all of which will more fully appear hereinafter from the ensuing claims which are to be read in connection with the accompanying drawings.

The main object of my present invention is to provide a compact and efficient apparatus in which catalytic reactions involving powdered catalyst may be carried out continuously with a minimum amount of equipment and utilities.

A more specific object of my invention is to afford facilities for the proper regeneration of catalyst fouled during contact with the reactant vapor in a regeneration zone which is contiguously disposed below the reaction zone and permits the flow of fouled catalyst by gravity from the conversion zone into the regeneration zone.

I attain these objects by means illustrated in the accompanying drawings in which—

Fig. I is a vertical diagrammatic showing, partly in section of my improved reactor and its immediate accessory apparatus; Fig. II is a modification of Fig. I, in which I show a standpipe to cause circulation of catalyst.

Similar reference characters refer to similar parts throughout the views.

Referring in detail to Fig. I, I represents a conversion chamber and 2 a regeneration chamber integral therewith and together forming a vertical cylindrical pipe or shaft separated, however, into the two chambers or compartments by a grid plate 3 disposed as shown about the midvertical point of the said cylindrical shaft. Disposed at the upper end of the vertical shaft and integral therewith is a disengaging chamber 4 of greater internal diameter than the conversion chamber immediately below. There is also disposed in an upper portion of disengaging chamber 4 a suitable dust separator such as a Cottrell precipitator 10 shown diagrammatically. At the bottom end of regeneration zone 2, I provide a suitable feeding mechanism for the flowing powdered material in the bottom of the chamber. In the illustration, I have shown a screw conveyor 15. The screw conveyor discharges powdered material into a suitable mixing device such as an ordinary injector where it is intermixed with steam discharged into said injector through a pipe 21 where it forms a suspension of the powder in the steam, and this suspension is then carried by a pipe 25 into the upper part of conversion chamber 1. The reactant is discharged into the lower portion of the conversion compartment through a pipe 27, and a diluent if used may be discharged into reaction compartment through line 28. The inlet pipe 27 and line 28 may be made mutually intercommunicating by a valve 30. I have also provided means for introducing steam or some other stripping gas into the bottom of the regeneration chamber 2 as through lines 40 and 41. If desired, air may be introduced into the bottom of the regeneration chamber through lines 40 or 41.

Having generally described the essential elements of my improved apparatus, I shall now set forth an example illustrating the method in which it may be employed. It can be assumed for purposes of illustration that reactant material introduced into the reactor through line 27 is a $C_4$ hydrocarbon fraction containing butylene which I desire to be dehydrogenated to butadiene. The feed stock entering through line 27 is at a temperature of 1100–1200° F. and by using a proper catalyst such as that disclosed in the Kearby application previously mentioned, i. e., a catalyst containing about 79 parts by weight of magnesium oxide, about 20 parts by weight of $Fe_2O_3$, about 5 parts by weight of CuO, and about 1½ parts by weight of $K_2O$ present in the conversion chamber in the form of a powder having a particle size of from 200–400 mesh to form within the said chamber a dense phase suspension having a weight of about 10–20 lbs. per cu. ft., the butenes present in the feed stock, particularly the butene-2, undergo dehydrogenation to form butadiene. The reactant is added by dilution with steam and consequently the entering gas preferably contains 4–20 volumes of steam per volume of hydrocarbon, and this mixture of steam and catalyst forms the suspension having the density indicated previously under best operating conditions. The linear velocity of the gases in the conversion chamber is such that the catalyst tends to gravitate slowly downward through the foraminous member 3 into the regeneration chamber 2, while the gaseous reactant product proceeds upwardly into disengaging chamber 4. If the linear velocities of the gas within the chamber 1 are from ½–3 ft. per second, catalyst will settle out by gravity as indicated but, nevertheless, it will be in a highly fluidized state, that is to say, it will not be compacted but rather it will be in an ebullient state of motion resembling somewhat a boiling liquid, and although the general direction of the catalyst will be downwardly there will be a multiplicity of cross currents and upwardly directed currents having a dense phase level in about the region of L. Above L, however, due to the expanded cross-sectional area of disengaging chamber 4, the velocity of the upflowing vapors will be greatly reduced so that further settling out of powdered catalyst occurs to the extent that when the vapors reach the Cottrell precipitator 10 they contain only about 0.0025 pound of catalyst per cubic foot of vapor or less. The vapors still containing, however, a small amount of catalyst pass through the Cottrell precipitator and are withdrawn through line 50. The reaction product in line 50 may be processed by distillation and solvent treatment to recover the butadiene and to recycle unreacted olefins in equipment not shown. The purification and recovery of butadiene does not form an integral part of this invention and it may be accomplished in apparatus not shown.

The catalyst which descends through the grid plate 3 into regeneration compartment 2 is treated by steam entering through lines 40 and 41, and in the case of butene dehydrogenation employing the catalyst mentioned above, the tarry and cokey contaminants undergo water-gas reaction to form CO and $CO_2$, thus consuming the contaminants on the catalyst and purifying the same. These gaseous products of regeneration, together with steam, pass upwardly into the conversion zone, but in the case of butene dehydrogenation they in nowise interfere with the reaction and, moreover, when they are withdrawn with the reaction products through line 50 they may be readily separated from the reaction products, for example, by caustic soda or sodium carbonate, or a combination of these, or otherwise removed in known manner. It is not satisfactory, according to best practice, to regenerate the catalyst in regeneration chamber 2 with air because of the introduction of nitrogen which is a difficult substance to remove. However, if it is desired to supply oxygen to aid in the regeneration in chamber 2, same is preferably supplied in relatively pure form or intermixed with a minimum amount of nitrogen.

In Fig. II, I have shown a modification in which catalyst may be withdrawn by gravity through a standpipe 29, mixed with steam in an injector 22 to form a suspension disposed in the bottom of the standpipe 29, the steam entering through pipe 21, and the suspension then discharged into the bottom of regenerator 2. The rate of flow of catalyst in standpipe 29 is controlled by a slide valve 23 or any other suitable means. Supplemental steam may be discharged through the bottom of regenerator through line 32. The hydrocarbon feed stock may be introduced as in the previous modification through line 27, together with steam added through line 28. Gas such as steam is discharged through pipes 31 into pipe 29 to fluidize the catalyst therein. The manner of operating the modification shown in Fig. II is otherwise the same as that shown in the modification of Fig. I.

In butene dehydrogenation there is of course an absorption of heat due to the nature of the reaction. In order to compensate for the heat of reaction, preheated steam at a temperature of approximately 1300° F. is employed, or the catalyst may be heated by heat exchange while passing through line 25 in communication with a heating device 2, diagrammatically shown. (See Fig. I). When oxygen is introduced into the regeneration chamber, the heat lost in conversion chamber 1 may be compensated for by means of the heat generated in the regeneration chamber 2 at least in a large degree, and therefore the hot regenerated catalyst is withdrawn from regeneration chamber 2 and without opportunity substantially to cool, it is returned to the conversion chamber, thus transferring heat from the regeneration chamber to the conversion chamber.

While I have described my invention in detail with reference to butene dehydrogenation, it is to be understood that the process and apparatus are equally applicable to the cracking of a gas oil, to the reforming of naphthas, to the polymerization of olefins and to numerous other hydrocarbon reactions wherein hydrocarbon vapors are treated with a catalyst in powdered form under conditions such that the conversion results in the deposition of combustible material on the catalyst.

I consider one of the main advantages of my invention to be that in the case of butene dehydrogenation which is carried out at temperatures around 1200° F., that preheating above this temperature before discharge into the reaction zone is avoided since heat is available in the conversion zone from the reaction taking place in the regeneration chamber. When a butene is preheated above 1200° F. there is danger of thermal degradation with consequent loss in yields. In the normal operation, due to the endothermic nature of the reaction, the feed stock is usually heated above reaction temperatures to compensate for the heat lost during the endothermic reaction of dehydrogenation. As indicated, this dangerous heating above reaction temperatures is obviated in my process. Another advantage of my invention is that because it is unnecessary to preheat above reaction temperatures, it is not necessary to use expensive alloys which must be used when very high temperatures are employed. In the dehydrogenation of butene, according to my process, for the reasons given, the feed stock entering at 27 will not be heated above reaction temperatures. Of course, among the advantages of my improved apparatus is the maintenance of continuity of operation in a single unit or reactor, whereas in the fixed bed type of operation it will obviously be necessary to use a plurality of reactors to maintain overall continuity of operation since in that type of operation it is necessary to discontinue the reaction to regenerate the catalyst. This plurality of reactors greatly complicates and increases the necessary equipment, requiring among other things complicated manifolding systems and automatic valves, both of which are apt at any time to get out of working order.

Another advantage of my process is that in a fixed bed type of operation a large part of the cost of catalyst preparation lies in forming the catalyst into pills. In my operation, the catalyst is simply a powder and does not have to be pilled.

A further advantage of my invention is that in fixed bed units the contact time between gas and catalyst in the reaction zone must be very short, say of the order of 0.3 second, in order to prevent degradation of the butadiene formed. This short contact time requires high temperatures in order to get the desired conversion, and of course it is the high temperature which causes the degradation of the product. In my apparatus I may operate at considerably lower temperatures and may therefore extend the contact time to 10 seconds, which means that I may operate at around 1000° F. as compared with the 1200° F. temperature commonly employed in the fixed bed type of operation.

Numerous modifications of my invention may be made without departing from the spirit thereof. For example, in line 25 (Fig. I), I may dispose more than one heat exchanger or other heating means for heating the regenerated catalyst to higher temperatures. This has the advantage that the feed stock entering through line 27 need not be heated to as high a temperature as would be necessary where the catalyst is not externally heated in the manner indicated. A further modification of my invention falls within the scope of cooling a portion of the regenerated catalyst and discharging it into the region of the conversion chamber just above L or in the disengaging chamber 4 where it serves to quench the reaction products to temperatures below that at which decomposition may occur. Thus the catalyst may be cooled to a temperature of say 300–500° F. and discharged in quantity into the reaction products from which the catalyst abstracts heat and insures against losses by decomposition of the butadiene, if that is the product being manufactured.

I am aware that prior to my invention fluid catalyst processes were known and used by others, and I do not claim such operation of any apparatus therefor broadly.

What I claim is:

1. The combination in a fluid catalyst apparatus comprising a conversion chamber and a regeneration chamber contiguously and vertically disposed, a foraminous member interposed between said chambers, a disengaging chamber disposed immediately above said conversion chamber, the disengaging chamber being of an internal diameter greater than the said conversion chamber, feeding means for withdrawing powdered material from the bottom of the regeneration chamber, and conduit means adapted to convey powdered material in the form of a suspension to the conversion chamber, all substantially as set forth.

2. In combination, a vertical elongated zone of restricted cross-sectional area, a foraminous member disposed in the said elongated zone forming two chambers within said zone, a disengaging chamber superimposed on the upper end of said elongated zone, said disengaging chamber being of greater cross-sectional area than the first-named zone, a standpipe in communication with the uppermost of said chambers adapted to withdraw powdered material by gravity therefrom, a gas-solid mixing means disposed at the lower end of said standpipe, conduit means extending into said mixing means adapted to convey a gas into said last-named means whereby solid material therein may be dispersed in said gas, and conduit means connecting the said mixing means with the bottom of the lowermost said chambers whereby a suspension may be discharged into said bottom of said lowermost chamber.

3. The combination of a fluid catalyst apparatus comprising a vertical, elongated, substantially cylindrical shell type vessel, a foraminous member interposed at substantially the mid-vertical point of said vessel, the foraminous member forming a demarcation between an upper conversion chamber and a lower regeneration chamber, a disengaging chamber superimposed on said conversion chamber, the said disengaging chamber being of greater cross-sectional area than said cylindrical vessel, means for causing outside circulation of powdered material continuously between said conversion and regeneration chambers, means for supplying a reactant to a point at the lower end of the conversion chamber, conduit means for supplying regeneration gas to the lowermost point at the bottom of said regeneration chamber, and means disposed at the upper portion of said disengaging chamber for withdrawing gaseous material.

4. The apparatus set forth in claim 3, in which the means for circulating powdered material between the said chambers comprises a solid feeding means disposed at the lower end of said regeneration chamber adapted to withdraw powdered material therefrom, an injection means adapted to form a suspension of said powdered material and a gasiform material, and conduit means adapted to convey the suspension formed in the injection means to the conversion chamber.

5. The apparatus set forth in claim 3, in which the means for causing circulation of powdered material between the conversion chamber and the regeneration chamber comprises a standpipe whose upper end is in communication with the upper portion of the conversion chamber and whose lower end is in communication with an injection means, means for injecting a gaseous medium into said injection means to form a suspension, and conduit means for conducting the suspension formed in the injection means into the lower portion of the regeneration chamber.

6. In the catalytic dehydrogenation of butenes, the improvement which comprises discharging preheated butenes into a vertically disposed conversion chamber of restricted cross-sectional area, simultaneously discharging into said chamber a fluidized powdered catalyst material, causing the powdered material to gravitate through a foraminous member into a regeneration chamber contiguously disposed immediately below said conversion chamber by regulating the velocity of the gas in the conversion chamber to permit said gravitation, contacting the catalyst in the regeneration chamber with steam whereby contaminants thereon are consumed and catalyst is revivified, withdrawing revivified catalyst from the bottom of said regeneration zone, and recycling it substantially uncooled to a point near the top of said conversion zone.

7. In the catalytic dehydrogenation of olefins, the improvement which comprises discharging preheated olefins into a vertically disposed conversion chamber of restricted cross-sectional area, simultaneously discharging into said chamber a fluidized powdered catalyst material, causing the powdered material to gravitate through a foraminous member into a regeneration chamber contiguously disposed immediately below said conversion chamber by regulating the velocity of the gas in the conversion chamber to permit said gravitation, contacting the catalyst in the regeneration chamber with steam whereby contaminants thereon are consumed and catalyst is revivified, withdrawing revivified catalyst from the bottom of said regeneration zone, and recycling it substantially uncooled to a point near the top of said conversion zone.

EDWARD D. REEVES.